D. D. ROBERTS.
BELT TIGHTENER.
APPLICATION FILED JULY 22, 1920.
1,363,015.
Patented Dec. 21, 1920.
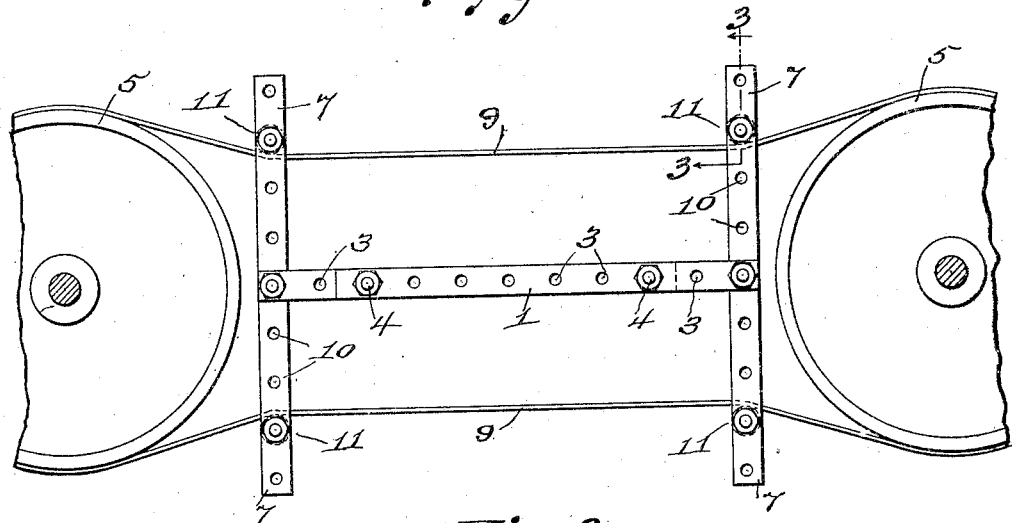
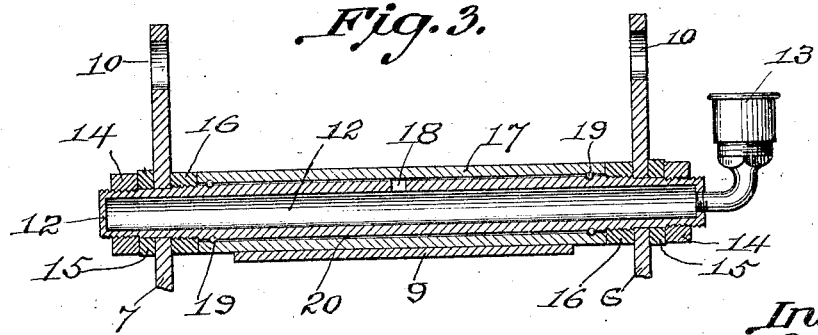
Inventor
Drew D. Roberts
By C. F. Belt
Attorney

UNITED STATES PATENT OFFICE.

DREW D. ROBERTS, OF PERRY, FLORIDA.

BELT-TIGHTENER.

1,363,015.

Specification of Letters Patent. Patented Dec. 21, 1920.

Application filed July 22, 1920. Serial No. 398,143.

*To all whom it may concern:*

Be it known that I, DREW D. ROBERTS, a citizen of the United States, residing at Perry, in the county of Taylor and State of Florida, have invented certain new and useful Improvements in Belt-Tighteners, of which the following is a specification.

This invention relates to pulleys, shafts and belts, and pertains especially to belt tighteners.

The object of the invention is to provide a belt tightening device of such novel and peculiar construction and arrangement of parts as to afford longitudinal and vertical adjustment in its parts as desired or as occasion may demand, whereby the belt-engaging rollers may be contracted and expanded with respect to one another and with respect to the belt pulleys.

A further object of the invention is to provide belt-tightening rollers of such novel and peculiar construction and arrangement of parts as will afford means for lubricating the same during a belt-tightening operation, and to furnish special means for revolubly mounting the rollers in the roller frame so that the oil feeding may remain stationary during rotary movement of the rollers in a belt-tightening operation.

Various other objects, advantages and improved results are attainable in the manufacture and practical application of the invention.

In the accompanying drawings forming part of this application:—

Figure 1 is an end view of a pair of shaft pulleys, partly broken away, showing the application of the invention in belt-tightening position.

Fig. 2 is a top view of the device as shown in Fig. 1.

Fig. 3 is a sectional view taken on the dotted line 3—3 Fig. 1.

The same reference characters denote the same parts throughout the several views of the drawings.

In carrying out my invention, I employ a metal frame comprising two pair of longitudinal members 1 and 2 provided with holes 3 for bolts 4, one of the two members overlapping the other member so as to afford longitudinal adjustment of the frame between a pair of shaft pulleys 5. The outer ends of the members 1 and 2 are attached to vertical frame members 6 and 7, by means of bolts 8, preferably central of the length of the vertical members 6 and 7, which are arranged in pairs so as to permit a belt 9 to work therebetween. The members 6 and 7 are provided with holes 10 for mounting the belt rollers 11. All of these rollers being of the same construction only one of them will be described in detail. The tube or pipe member 12 of the roller has a closed end, and the other end thereof has an oil cup 13 attached thereto. The pipe member 12 of the roller device is fixed in the holes 10 of the vertical frame members 6 and 7 by means of nuts 14, washers 15 and screw bushings 16. A sleeve or cylindrical member 17 is revolubly mounted on the pipe 12 between the bushings 16 so that the latter form thrust bearings for the sleeve member 17. The pipe 12 has an oil duct 18 for lubricating the sleeve. There are ball bearings 19 between the sleeve and the pipe forming a lubricating space 20, and permitting lubrication of the thrust bearings as well as throughout the length of the sleeve.

It will be seen that the rollers may be changed from one set of holes in the vertical frame members to another set of such holes so as to adjust the rollers relative to each other vertically, and with respect to the condition of the belt for tightening the same. In order to give the rollers relative longitudinal adjustment, the longitudinal frame members are adjusted so as to vary the space between the vertical frame members.

It will be observed that the construction of the rollers affords a ball bearing lubricating assembly which permits the rollers to be changed from one position to another by merely removing and replacing the nuts and washers without separating the pipe and the other roller sleeve, or removing the oil cups.

I do not wish to be understood as confining the invention to any particular size and material, nor to the number of rollers, nor to the application of the invention to any particular belts, but reserve the right to make such changes and variations in the manufacture and practical application of the invention as may come within the scope of the appended claim.

Having thus described my invention what I claim as new and desire to secure by Letters Patent is:—

In a belt-tightening device, a frame applied to outer edges of the belt, rollers spanning the outer face of the belt and comprising an oil-feeding pipe adjustably secured to certain members of the frame and having an oil duct leading therefrom, a belt-bearing sleeve revolubly mounted on the pipe between said frame members, and an oil cup secured to one end of the pipe, said adjustment being perfected without removing the sleeve from the pipe.

In witness whereof I hereunto set my hand in the presence of two witnesses.

DREW D. ROBERTS.

Witnesses:
W. T. HENDRY,
C. P. DIAMOND.